Aug. 28, 1956  B. F. MIESSNER  2,761,127
ELECTRICAL TONE GENERATOR
Filed Dec. 9, 1950  3 Sheets-Sheet 1
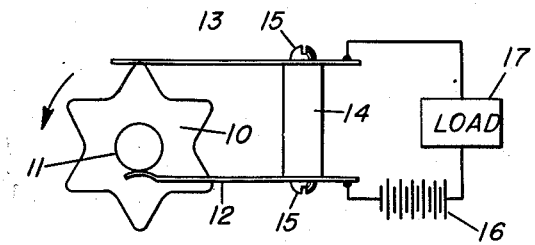
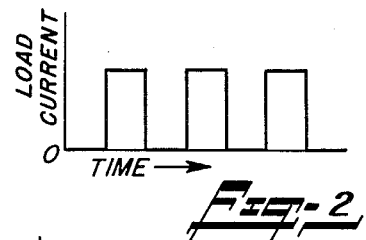
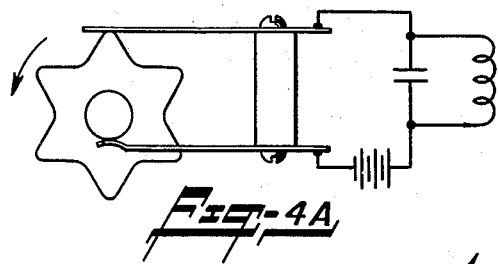
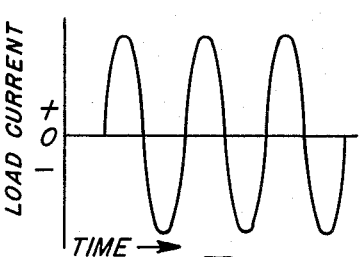
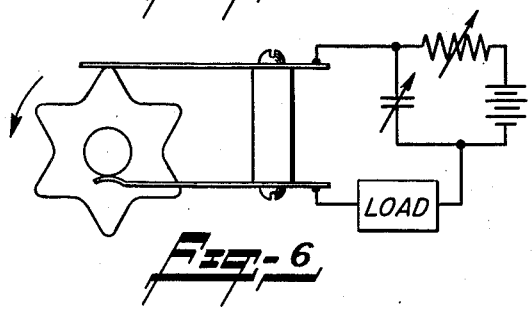
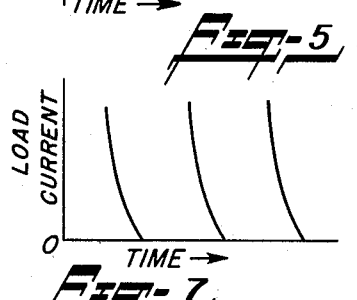
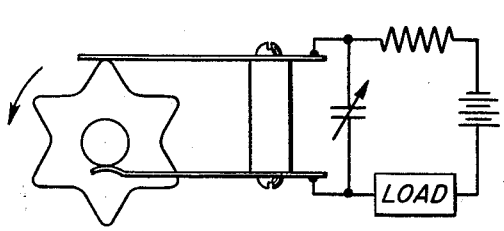
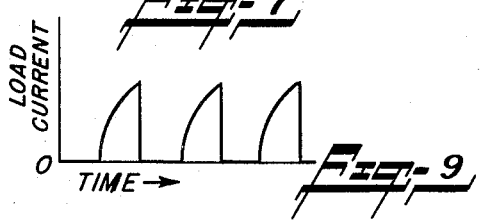
BENJAMIN F. MIESSNER
INVENTOR.
BY
ATTORNEYS

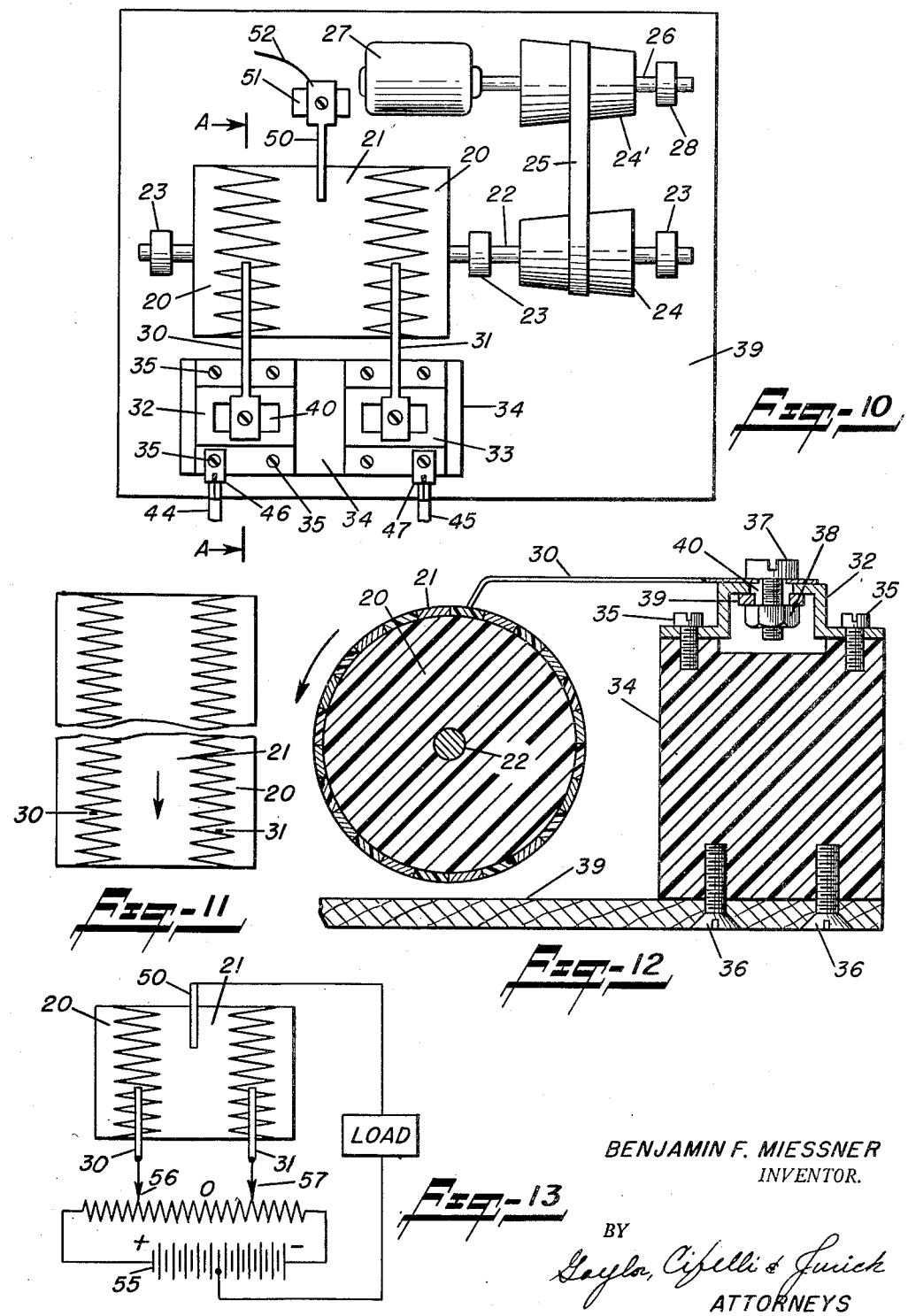

Aug. 28, 1956  B. F. MIESSNER  2,761,127
ELECTRICAL TONE GENERATOR
Filed Dec. 9, 1950  3 Sheets-Sheet 3

BENJAMIN F. MIESSNER
INVENTOR.

BY
ATTORNEYS

United States Patent Office 2,761,127
Patented Aug. 28, 1956

2,761,127

ELECTRICAL TONE GENERATOR

Benjamin F. Miessner, Harding Township, Morris County, N. J., assignor to Miessner Inventions, Inc., Harding Township, Morris County, N. J., a corporation of New Jersey Application December 9, 1950, Serial No. 200,025

7 Claims. (Cl. 340—384)

This invention relates to an electrical tone generator and more particularly to an arrangement for producing complex, electrical vibrations directly from sources of electrical energy by means of novel current interrupters.

In my copending patent application Serial No. 169,714 filed June 22, 1950, I have disclosed a principle of tone-production in which essentially pendular vibrations of a mechanical vibrator are converted into highly complex electrical vibrations, of various types, by means of suitably positioned and shaped electro-static pickup electrodes and other devices operating through electromagnetic or photo-electric action. In the present invention such complex electrical vibrations are produced by current interruptions of an electrical energy source. These current interruptions are obtained by mechanical contact interrupters of the vibratory or rotary type, the latter being preferred for its better frequency, control and stability for musical purposes.

In my above-identified application, various voltage wave shapes, corresponding to various desired tone qualities, are generated in capacity-modulated translating devices which modulate the frequency and/or the amplitude of a radio frequency current. In the present invention, however, such wave shapes are obtained by electrical contact made with rotary commutators whose cyclic contacts can be varied in time duration and/or phase.

An object of this invention is the provision of an arrangement for the production of a variety of musical tones from a constant source of electrical energy.

An object of this invention is the provision of a novel mechanical arrangement for the interruption of an electrical energy source whereby various electrical wave shapes are obtained for the production of musical tones.

An object of this invention is the provision of a tone generator comprising a rotatable drum, a serrated commutator plate carried on the drum surface, a set of resilient brushes adapted to move over the serrated ends of the commutator plate, a source of electrical energy, and a load connected between the said source and the said brushes.

An object of this invention is the provision of a tone generator comprising a rotatable drum carrying a serrated commutator plate, a set of brushes adapted for sliding contact with the serrations of the plate, a source of electrical energy, a load connected between the midpoint of the source and the plate, a resistor connected across the source, and leads independently connecting each of the brushes to separate points on the said resistor.

An object of this invention is the provision of an electrical tone generator comprising a tuned load connected to a source of electrical energy, a circuit interrupter between the load and the source, means for selectively altering the wave form of the current in the tuned load upon interruptions of the circuit, and electro-acoustic means for translating the current waves into audible tones.

An object of this invention is the provision of an arrangement for producing complex electrical vibrations from a source of electrical energy, and comprising a set of electrical contacts slidable over a serrated plate, means for moving the plate relative to the contacts at a preselected speed, means for independently adjusting the position of each contact relative to the plate, a load energized by the current flowing through the contacts and circuit components of resistive, inductive and capacitive character adapted for independent insertion into the load circuit in either series or parallel relation.

These and other objects and advantages will be apparent from the following description when taken with the accompanying drawings illustrating several embodiments of the invention. The drawings are for purposes of illustration and are not to be construed as defining the scope or limits of the invention, reference being had for the latter purpose to the appended claims.

In the drawings wherein like reference characters denote like parts in the several views:

Figure 1 illustrates an elementary arrangement of a tone generator of the type contemplated by this invention;

Figure 2 illustrates the wave shape of the current when the load is pure resistance and the electrical circuit is opened and closed for equal time periods;

Figures 3 and 4 illustrate the wave shapes when the load is inductive and capacitive, respectively;

Figure 4A illustrates a tuned load consisting of a capacitor and inductance;

Figure 5 illustrates the wave shape when the inductance and the capacitor of the Figure 4A circuit are tuned to the current interruption frequency;

Figure 6 illustrates a modification of the Figure 1 circuit wherein a battery is used to charge a condenser through a resistance;

Figure 7 illustrates the current wave through the load in the Figure 6 arrangement;

Figure 8 is another circuit variation wherein the load is placed in the common lead of the charge and discharge circuit of the condenser;

Figure 9 illustrates the current wave obtained from the Figure 8 arrangement;

Figure 10 is a plan view of my novel interrupter employing a rotating drum;

Figure 11 is a linear projection of the drum surface and the serrated commutator plate;

Figure 12 is a cross-section taken along the line A—A of Figure 10 and drawn to an enlarged scale;

Figure 13 illustrates the above device connected into an electrical circuit of the voltage-divider type;

Figure 14:
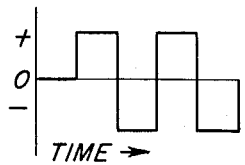
Figure 14 illustrates the wave form of the current flowing through the load in the Figure 13 circuit when such load is resistive.

Referring to Figure 1, there is shown a simple current interrupter arrangement comprising a metal, rotating, toothed wheel 10 having an integral hub 11 thereon. A metallic brush, or spring contactor 12, remains in constant contact with the hub while a similar contactor 13 is positioned to contact only the teeth of the wheel. The contactors are supported on an insulating member 14, as by the screws 15, and are connected to an electrical circuit comprising a battery 16, or other source of electrical energy, and a load 17. By proper design of the toothed wheel, the electrical circuit will be opened and closed for substantially equal time periods, by the contractor 13, as the wheel rotates at a uniform speed. Such an arrangement will produce rectangular shaped current pulses, having a frequency determined by the speed of rotation of the wheel and the number of teeth thereon. If the load 17 is of a resistive character. The wave shape of such pulses is shown in Figure 2. It will be apparent the width of the current pulses, along the time axis, can be varied by varying the ratio of the on and off contact time and that the voltage pulses will have a corresponding wave formation. If, however, the load is of an inductive character the wave shape will change to that shown in Figure 3. A capacitive load having a discharge circuit will result in the wave shape shown in Figure 4. For a load consisting of an inductance and a capacity (Figure 4A), tuned to the current interruption frequency, the wave shape will become more nearly sinusoidal, as shown in Figure 5.

If a battery is used to charge a condenser through a resistance, and their time constant be made adjustable, as shown in Figure 6, various other wave shapes may be obtained such as, for example, the discontinuous wave of Figure 7. By placing the load device in the common charge, discharge circuit, as shown in Figure 8, the charge rate may be made slow and the discharge rate rapid, resulting in the wave formation of Figure 9.

All of the above basic circuits, in various adjustments of capacity, inductance and resistance may be utilized to produce a large variety of wave shapes. When such circuits are employed with a contact interrupter which provides variation of the amplitude, time period and phase relations between positive and negative current pulses there is available a vast variety of complex wave shapes corresponding to many variations in output tone quality, as will be described hereinbelow. It may here be pointed out that by making the power-handling capacity of the circuit components large, the output or load currents may be used directly for the operation of an electro-acoustic transducer to provide audible tones. Alternatively, a suitable amplifier may be used for energizing the transducer to permit the use of relatively small circuit components.

Figures 10 to 12 illustrate the construction of my novel, rotary type of circuit interrupter. Here, a drum 20, made of insulating material, carries a commutator plate 21 imbedded in the surface, said plate having serrated edges, substantially as shown. The drum is rigidly secured to a shaft 22 journaled for rotation in the bearings 23. A cone shaped pulley 24 is likewise rigidly secured to the drum shaft and is connected to a similar, reversely-disposed pulley 24' by a belt 25, the latter pulley being affixed to the extended shaft 26 of a synchronous motor 27. A bearing 28 maintains a proper alignment of the motor shaft with respect to the drum shaft. A pair of contact brushes 30, 31 are slidably attached to their respective mounting plates 32, 33 in such manner that they, individually, may be adjustably positioned in a direction parallel to the drum shaft and in a direction parallel to their own axis. As shown more clearly in the enlarged cross-sectional view of Figure 12, the mounting plate 32, of the brush 30, is secured to an insulating post 34 by screws 35, said post being secured to the base 39 of the device as by the screws 36.

The brush 30 is adjustably secured to the mounting plate 32 by the screw 37 cooperating with the nut 38 and the washer 39. It will be noted that the slot 40 in the mounting plate is somewhat wider, in the direction of the brush axis, than the hole in such brush. Consequently, the precise point of contact between the brush end and the commutator plate 21 may be established by simply loosening the screw 37, sliding the brush toward or away from the drum, and then tightening said screw. Similarly, loosening of the fastening screw permits lateral movement of the brush along the elongated slot 40 in the mounting plate 32 (see Figure 12) to afford adjustment of the brush position along the drum axis. Wire leads 44, 45 may be connected to the brushes 31, 32 through the medium of conventional solder connectors 46, 47 secured under the screws that secure the respective mounting plates to the insulator post 34. A third brush 50 is mounted in fixed position on an insulator support 51 and is positioned to establish continuous electrical contact with the commutator plate 21 as the drum rotates and may be connected into the electrical circuit by a wire 52 soldered directly to the tail of the brush.

The contactor brushes have narrow widths (along the drum axis) and have downwardly bent ends, as shown in connection with the brush 30 in Figure 12, and preferably are made of spring material that is thin relative to the average width of the commutator teeth and the spacing therebetween.

The above described arrangement is connected into an electrical circuit of the general type shown in Figure 13, which circuit, however, may contain other components as previously disclosed. It will be apparent the Figure 13 circuit is of the voltage-divider type. The load is connected between the mid point of the power source, indicated by the battery 55, and the fixed brush 50, while the adjustable brushes 30, 31 are connected to the potentiometer sliders 56, 57. By displacing the brushes 30, 31 a distance equal to the width of one commutator bar the pulsed current flow through the load will be, alternately, positive and negative. Such disposition of these brushes, peripherally with respect to the commutator 21, is shown in Figure 11 which is a linear projection of the commutator plate and the drum surface. Upon movement of this surface in a downward direction, as indicated by the arrow, the brush 31 is just leaving the metallic tooth of the commutator as the brush 30 is just leaving the insulated section. With the brushes so placed, and the sliders 56 and 57 set to equal positions on either side of the zero potential position, 0, Figure 13, the current wave through the load will take the form shown in Figure 14 provided the load is resistive. If the load be inductive, or capacitive, the wave will be of the type shown in Figure 15. However, if the load be a capacitor shunted by an inductance and tuned to the contact make and break frequency, the curve of Figure 16 is obtained. The latter wave form would be obtained if the damping factor of the tuned circuit were very low and the Q of the circuit high. Where the circuit Q is low the curve will include other components than the fundamental here shown.

Figure 15:
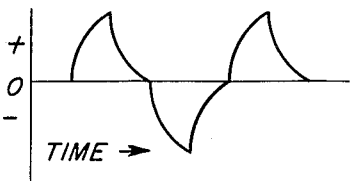
Figure 15 illustrates the wave form when such load is inductive.
Figure 16:
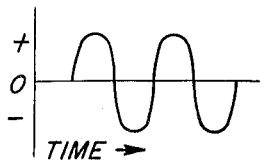
Figure 16 illustrates the wave form when the load is a tuned circuit tuned to the contact frequency.
Figure 17:
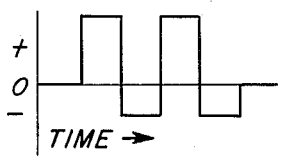
Figure 17 illustrates an asymmetrical wave obtained when the amplitudes of the positive and negative pulses through the load are unequal.
Figure 18:
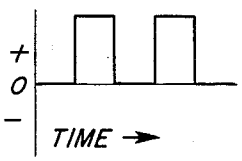
Figure 18 illustrates an asymmetrical wave obtained when the negative half of the wave is reduced to zero.

It will be noted that the curves of Figures 14 to 16 are symmetrical about the zero axis and, as is well known, such symmetrical waves contain only even numbered partial components. If, however, the amplitude of either the positive or negative components of the wave are changed, as by adjustment of the slider 56 or 57, the wave will become asymmetrical. As shown in Figure 17, this particular asymmetrical wave is produced when the slider 56 (Figure 13) is disposed further from the zero point on the voltage divider than is the slider 57. If now, the slider 57 be placed on the zero voltage point (midpoint of the resistor) the wave will have the form shown in Figure 18.

In all of the curves, or wave forms, thus far described it has been assumed that the circuit interrupting arrangement has been such as to provide equal "on" and "off"

periods. This means that the brushes 30, 31, in Figure 10, are equally spaced to either side of the longitudinal axis of the serrated commutator plate and that such serrations are symmetrical. In a symmetrical arrangement, such as this, and with the ends of the brushes spaced (180 electrical degrees apart along the periphery of the commutator plate), the positive and negative pulses are equi-spaced along the time axis.

Figure 19:
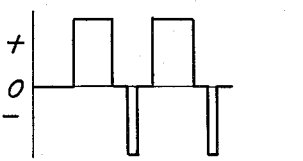
Figure 19 illustrates an asymmetrical wave wherein the phase displacement of the negative cycle of the wave, relative to the positive cycle, has been altered by a lateral displacement of the negative brush along the commutator plate.
Figure 20:
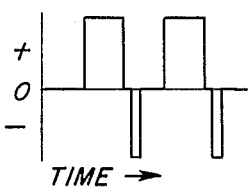
Figures 20 and 21 illustrate representative waves wherein the relative phase displacement of the negative cycle of the wave, relative to the positive cycle, has been altered by changing the longitudinal position of the negative brush along the commutator plate.
Figure 21:
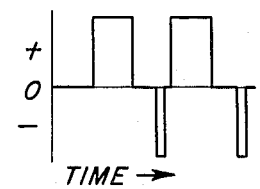

I have already explained the amplitude variation of the two halves of the wave by unequal settings of the sliders 56, 57 in the Figure 13 circuit arrangement. Relative phase displacement of the two halves of the wave are achieved by appropriate setting, or unbalancing, of the contact brushes with respect to the commutator plate. Assume now that the sliders 56 and 57 are positioned equally to either side of the midpoint of the resistor, thereby resulting in positive and negative half-waves of equal amplitude. If now the brush 31 (Figures 10 and 11) is moved in the direction of the proximate drum edge the time during which contact is established between the brush and the individual serrations of the commutator plate is lessened by reason of the reduced, effective length of the serrations in the direction of brush travel. A wave such as that shown in Figure 19 results. If, additionally, the brush 31 is moved along its own axis, that is, normal to the drum axis, the 180 degree phase angle, within one cycle of output current, can be shifted to various positions between the positive pulses along the time axis, as shown in Figures 20 and 21.

Figure 22:
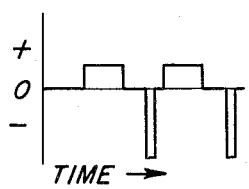
Figures 22 and 23 illustrate asymmetrical waves resulting from a combination of amplitude and phase variations in the negative cycle relative to the positive cycle.
Figure 23:
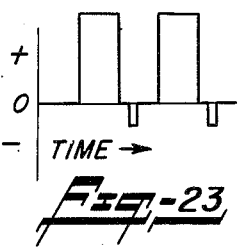

By combining the amplitude variations and the phase displacement variations, numerous other wave shapes may be obtained such as for example, those shown in the self-apparent formations of Figures 22 to 23.

Figure 24:
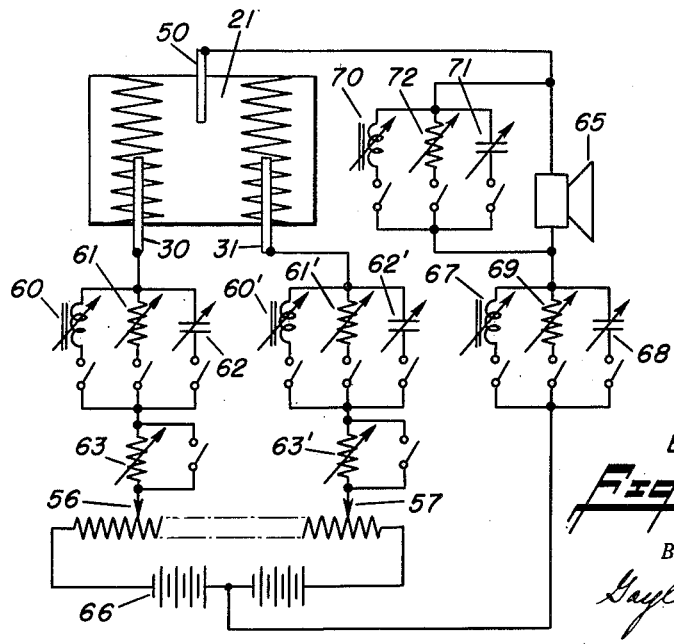
Figure 24 is a representative circuit diagram showing inductive, capacitive and resistive components selectively connectable into the circuit to produce output tones of a desired quality, or harmonic content, from a loud speaker.

Since the individual positive and negative half waves can also be further, and very significantly, varied by choice of the load device (resistive, capacitive, inductive, or combinations of these), as previously discussed, it will be apparent that extremely wide variations in wave shapes are obtainable resulting in corresponding variations in output harmonic content or tone quality. Thus, various forms of resistive, reactive or filter circuits, such as low pass, high pass, band pass types, may be included in either or both of the brush circuits so as to vary the wave shape and the tone quality of the output tones of a loud speaker connected in the common arm of the circuit as indicated by the load device in Figure 13. For purposes of illustration, one such arrangement is shown in Figure 24. In this case each brush 30, 31 is connected to its respective slider 56, 57 through a parallel arrangement of an inductance 60, 60', resistance 61, 61' and condenser 62, 62', and the series resistance 63, 63'. Each of these components is of the adjustable type and is associated with an individual switch by which various combinations may be included in, or excluded from, the circuit. An electro-acoustic device 65 is connected between the midpoint of the battery 66 (or other suitable source) and the rotatable commutator plate 21 through the brush 50. Included in the latter circuit, in series with the loud-speaker 65, is a parallel formation of individually-adjustable components comprising an inductance 67, condenser 68 and resistor 69, each connectable into the circuit by an individual switch. A similar arrangement of inductance 70, condenser 71 and resistor 72 may be connected across the loud-speaker 65. It will be understood that each of the individual components shown in the diagram may be connected to form various series, parallel, series-parallel or other well known and more complicated filter forms of circuits in order to achieve the widest and most flexible control over output tone quality and (or amplitude). Additionally, the load device itself may be connected in series or in parallel with various other resistive or reactive components, which will react equally on the positive and negative half waves, to provide more complex waves characteristic of a given tone quality.

While the use of voltage or power amplifiers is not considered necessary with my tone production system it is, of course, permissible to use such devices where the pulse producing and forming circuits are designed for power levels inadequate for the desired output tone power.

It will be understood, also, that instead of the battery or direct current energy source described, a superaudible radio frequency primary source may be used, that demodulators may be used to recover the audio components, and that audio frequency filter circuits may be incorporated in the two demodulator output arms as well as in the common audio frequency load arm of the combined circuit.

While I have shown but a single tone generator whose absolute frequency may be made equal to one or another pitch of a musical scale of frequencies, it will be understood that a plurality of such tone generators may be used to provide the frequencies of a complete musical scale of desired compass.

As is well known in the art, all octave-related tone frequencies may be generated by a single motor or shaft on which are mounted commutators having tooth members numerically corresponding to the frequency ratios 1, 2, 4, 8, 16, etc., whereby twelve (12) separate such shafts rotating at specific speeds which, multiplied by the number of commutator teeth on the octave-related commutators, produce all the tones of the equi-tempered, or other, musical scale frequencies. Likewise, as is also known in the art, a single, synchronous A. C. motor may, through a series of gears and pinions or cone pulleys, be used to produce, respectively, either the approximate, or the exact, frequencies of the musical scale through twelve (12) octave-related series of commutators rotating at twelve (12) different speeds which speeds, in revolutions per second, are approximately, or exactly, related by the factor of $$12\sqrt{2}$$

It may be stated at this point that conventional electronic organs utilizing vacuum tube oscillators of the relaxation type initially provide essentially square-wave shapes, rich in all even and odd Fourier series components. These waves are so shaped, by following audio frequency circuits, as to regulate the harmonic content and thus vary the output tone quality. Such arrangements, considering the great number, and electrical and mechanical delicacy, of the circuit components, are relatively very expensive, complicated and unreliable as compared to the hereindescribed tone generating system. Nor can such conventional organ circuits produce the wealth of very high partials which my interrupted-contact system is capable of, as the former require the utmost in wave front steepness. Such wave fronts are achieved by non-reactive circuits and are achievable to only a limited degree with the reactive circuits of audio frequency generators and amplifiers of conventional types. It is, of course, possible to use non-reactive, D. C. amplifiers to circumvent these deterrents to extremely high frequency partial development but these require delicate balancing adjustments which, generally, are unsuited for non-technical users, such as musicians.

Having now described my invention in detail in accordance with the patent statutes, various changes and modifications will suggest themselves to those skilled in this art, and it is intended that such changes and modifications shall fall within the spirit and scope of the invention as recited in the following claims.

I claim:

1. A musical tone generator comprising a rotatable drum of insulating material, a constant speed motor mechanically coupled to the drum, a metal cylinder circumscribing the drum surface and having serrated edges, a pair of contact brushes mounted substantially normal to the drum axis and having ends adapted for sliding contact with the cylinder serrations, adjusting means for independently adjusting the point of contact between each brush and the cylinder serrations, a source of constant potential, a voltage divider across said source, adjustable connections between each brush and said voltage divider, and an electrical circuit including an electro-acoustic transducer connected between the zero potential point of the voltage divider and the cylinder.

2. The invention as recited in claim 1, wherein the mechanical coupling between the motor and the drum includes adjustable means for altering the ratio between the motor and drum rotations.

3. A circuit interrupter for an electrical tone generator comprising a rotatable drum of insulating material, a metal plate on the drum surface, said plate having serrated edges, a set of contact brushes having ends slidably contacting the serrations of the plate, mounting means supporting each brush in relative fixed position relative to the plate and manually-operable means effective to adjust the position of each brush longitudinally and laterally relative to the drum axis.

4. The invention as recited in claim 3 wherein the means effective to adjust the position of the brushes comprises a mounting plate having a slot therein, a hole in the brush, said hole being smaller than the width of the slot in the mounting plate, and a screw passing through the brush hole and the slot into threaded engagement with a nut.

5. The invention as recited in claim 3 in combination with a constant speed motor and an adjustable speed coupling device between the motor and the drum.

6. The invention as recited in claim 3 wherein the adjustable speed coupling comprises a first cone-shaped pulley secured to the motor shaft, a second cone-shaped pulley rotatable with the drum and a flexible belt rotatably connecting the two pulleys.

7. A circuit interrupter for an electrical tone generator comprising a base, a shaft rotatably supported on the base, a constant-speed motor supported on the base, means coupling the motor to the shaft, a drum of insulating material secured to the shaft, a metal plate on the drum surface, said plate having serrated edges, a pair of brushes having ends in slidable contact with the serrations of the plate, means adjustably mounting each brush on the base, and a third brush supported on the base and having an end in contact with the body portion of said plate, said means coupling the motor to the shaft comprising a pair of reversely-disposed, cone-shaped pulleys connected by a flexible belt and the means adjustably mounting the pair of brushes on the base comprises a substantially U-shaped mounting plate having a longitudinal slot therein, said brushes being secured to the mounting plate by a screw passing through the slot and through a hole in the brush into threaded engagement with a nut.

References Cited in the file of this patent
UNITED STATES PATENTS

| | | |
|---|---|---|
| 653,784 | Anderson | July 17, 1900 |
| 904,782 | Hoffmann | Nov. 24, 1908 |
| 1,914,173 | Severy | June 13, 1933 |
| 1,991,775 | Spencer | Feb. 19, 1935 |
| 2,112,921 | Midgley | Apr. 5, 1938 |
| 2,429,236 | Potter | Oct. 21, 1947 |